United States Patent Office 3,817,771
Patented June 18, 1974

3,817,771
PROCESS FOR PREPARING SYNTHESIS RESIN FILMS OF IMPROVED STIFFNESS
Yujiro Nakayama and Mitsuo Yoshiyasu, Yokkaichi, Japan, assignors to Mitsubishi Petrochemical Company Limited and Kabushiki Kaisha Oji Yuka Goseishi Kenkyujo, Tokyo-to, Japan, fractional part interest to each
No Drawing. Filed Aug. 17, 1971, Ser. No. 172,543
Claims priority, application Japan, Aug. 21, 1970,
45/73,228
Int. Cl. B44d 1/32
U.S. Cl. 117—7                                        5 Claims

ABSTRACT OF THE DISCLOSURE

Microvoids formed in at least regions near the outer surface of a basic synthetic-resin film and communicating with the outside are filled with a polymerizable monomer, which is then polymerized within the microvoids, whereby the stiffness and other characteristics of the film are improved. The basic synthetic-resin film is preferably a film of a polyolefin, preferably a homo- or copolymer of ethylene, propylene, or butene-1, while the monomer is an ethylenically unsaturated monomer.

BACKGROUND

This invention relates generally to synthetic-resin films and more particularly to the production of new synthetic-resin films of improved stiffness.

As one kind of synthetic-resin film, a film having microvoids which communicate with the outside at least in regions near the surface of the film can be made. A film of this character can be formed by using a foaming agent and also by stretching a synthetic-resin film in which a fine filler has been blended. Furthermore, a film of this nature may be one having a laminated structure.

A synthetic-resin film of this nature is per se a useful material. For example, such a film containing a fine filler blended therein, particularly one having a laminated structure, has high utility as a synthetic paper. (Examples of such films are disclosed in U.S. Patent Appln. No. 809,629 filed on Mar. 21, 1969, and now abandoned, and No. 101,574, filed on Dec. 28, 1970, and now U.S. Pat. No. 3,765,999).

In some cases, however, the stiffness of such synthetic-resin films has not been entirely satisfactory for reasons such as the kind of synthetic resin used. It is apparent, therefore, that if it were possible to improve the stiffness of these synthetic-resin films, these films would be of even greater value.

SUMMARY

It is an object of this invention to realize this improvement of the stiffness of these synthetic-resin films. We have found that this object and other objects of the invention can be achieved by introducing a synthetic polymer into the above mentioned microvoids of each film.

According to this invention, briefly summarized, there is provided a process for producing synthetic-resin films of improved stiffness which comprises preparing a basic synthetic-resin film having microvoids disposed in at least regions of the film near the outer surface thereof and communicating with the outside, introducing a polymerizable monomer into these microvoids, and polymerizing this monomer within the microvoids.

According to this invention in another aspect thereof, there are provided a synthetic-resin film of improved stiffness comprising a basic synthetic-resin film having microvoids disposed in at least regions of the film near the outer surface thereof and originally communicating with the outside and a synthetic polymer contained and polymerized within the microvoids of the film.

The nature, utility, and further features of this invention will be apparent from the following detailed description beginning with a consideration of general aspects and features of the invention and concluding with specific examples of practice illustrating preferred embodiments thereof.

DETAILED DESCRIPTION

In accordance with this invention as summarized hereinabove, a synthetic polymer is introduced into the microvoids of a synthetic-resin film by "formation in situ" thereby to fill the microvoids and improve the stiffness of the film. We have found that this technique, moreover, greatly improves the surfaces characteristics of the film. For example, by introducing a polar synthetic polymer such as polymethyl methacrylate in the microvoids in the case of a relatively inert polyolefin-resin film, it is possible to improve other properties of the film such as adhesiveness and printability.

Furthermore, while synthetic-resin films having a large number of microvoids in regions thereof near their outer surfaces have insufficient surface hardness in many cases, the surface hardness of such films can be greatly improved by introducing a synthetic polymer, particularly a rigid polymer, into these microvoids. A further advantageous feature of this technique is that the surface luster of the starting-material film also can be improved by using a polymer to fill the microvoids having high luster such as polymethyl methacrylate.

In the practice of this invention, a synthetic-resin film having microvoids only in regions thereof near its outer surface is particularly desirable. In this case, since the synthetic polymer is introduced into only this region near the film surface, it is possible to avoid such disadvantages as an increase in the specific gravity of the film, a lowering of the whiteness or opacity thereof, and an increase in the processing cost, which accompany instances where the polymer is introduced even into the interior regions of the film.

This invention can be applied to any synthetic-resin film which has fine microvoids communicating with the outside in at least regions of the film near its outer surface.

Specific examples of "synthetic resins" of which such films are made are: polyolefin resins such as homopolymers and copolymers of α-olefins, e.g., ethylene, propylene, and butene-1; polystyrene resins such as homopolymers and copolymers of styrene, nucleus-substituted and (or) side-chain-substituted styrene, e.g., α-methylstyrene, vinyltoluenes, and chlorostyrenes; poly methacrylate ester resins such as homopolymers and copolymers of lower alkylesters; polyvinyl chloride resins; polyvinyl alcohols; polyamide resins, and mixtures thereof. These resins may contain fillers and other additives.

The "film" may be a laminated structure made up of two or more of these synthetic resins or of one or more of these resins and other film materials. This "film" may be in various forms, for example, sheets of considerable transverse width or tapes of relatively narrow width. Furthermore, the thickness of this film is ordinarily of the order of from 20 to 100 microns.

The microvoids existing in this film in at least regions near the outer surface thereof and communicating with the outside are preferably of a diameter (or the longest dimension in non-circular microvoids) of the order of from 5 to 20 microns. While microvoids of this character can be formed within the synthetic-resin film by any suitable method, one preferable method comprises monoaxially or biaxially drawing or stretching (i.e., orientating) a film containing a fine filler blended therewith.

That is, preferable films among the synthetic-resin films to which this invention can be applied are those produced by stretching single layers or laminated film layers of at least one polyolefin resin (e.g., polypropylene or high-density polyethylene) containing a fine filler or blended resins of different optimum stretching temperatures. Examples of such films are disclosed in U.S. Patent Appln. No. 809,629 filed on Mar. 21, 1969 entitled "Synthetic Papers and Method of Making the Same" and No. 101,-574 filed on Dec. 28, 1970 entitled "Synthetic Paper and Process for Producing the Same."

In a film of this character, since the microvoids are discontinuous in directions perpendicular to the film outer surface, the polymerizable monomer does not infiltrate into the film interior region. Consequently, the introduction of the synthetic polymer is limited to only the surface region, whereby the aforementioned advantages are attained.

The polymerizable monomer to be introduced into the microvoids of the synthetic-resin film should be in a liquid state. That is, it should be a liquid itself, or in the form of a solution under the introduction and polymerization conditions. In the case where the monomer is in the form of a solution, subsequent removal of the solvent is necessary but can be readily accomplished since the process material is a film. Furthermore, this polymerizable monomer should be a monomer which substantially will not dissolve the synthetic resin constituting the film.

A representative example of a "polymerizable monomer" of this character is a compound having at least one ethylenically unsaturated bond. Examples of known compounds of this character are vinyl compounds and conjugate diene compounds. Such a compound is selected to suit each purpose.

Of these compounds, monomers which are capable of forming polymers of second-order transition points above 40° C. are preferable since their effectiveness in increasing the stiffness of the film is excellent. Ethylenically unsaturated monomers of this character are known, specific examples thereof being styrene, methyl methacrylate, acrylonitrile, and divinylbenzene.

A "polymerizable monomer" of this specification may be one with which a synthetic polymer is formed by polycondensation or polyaddition. A polycondensation reaction is accompanied with liberation of a substance such as water, alcohols, or ammonia, but since the process material is a film, the liberation can be easily carried out.

In such cases, particularly in the case of a polycondensable monomer, the "monomer" may be one wherein condensation has progressed to a certain extent.

The polymerizable monomer may be introduced into the microvoids of the synthetic-resin film, in general, by a method such as contacting the film and monomer under reduced pressure (vacuum) and then applying thereto atmospheric or higher pressure.

The monomer thus introduced into the microvoids in the film is polymerized by imparting appropriate polymerization conditions to the monomer. The most representative procedure, in the case of a monomer having ethylenically unsaturated bonds, comprises adding beforehand a radical polymerization initiator to the monomer and heating the monomer with initiator. Another method comprises irradiating the monomer with high-energy radiation rays, in which case the effect of graft copolymerization may be expected.

Upon completion of the polymerization, necessary after-treatment steps such as washing and removing polymer adhering to the film surface are carried out, whereupon a product according to this invention is obtained.

Examples

1. A sheet of a synthetic paper of polypropylene (PP) which had a surface microvoid layer and a total thickness of 50 microns, was prepared and previously placed in an evacuated vessel to remove gases from the surface layer. The sheet was then steeped in a mixture solution of methyl methacrylate (MMA) and methanol (MeOH) in a ratio by weight of 7:3.

After 3 minutes, the synthetic paper, impregnated with MMA solution was taken out of the solution and placed in a polyethylene bag. Samples of this synthetic paper were then irradiated with radiation of 0.5 and 1.0 mrad., respectively, at room temperature with the use of Co-60 of 1,500 curies as the radiation source thereby to carry out graft copolymerization.

Next, a polypropylene film of a melt index (MI) of 4 and a thickness of 50 microns was prepared and subjected to the same process as described above.

The quantity of impregnating solution and percentage of weight increase with respect to each sample was determined. The results are shown in Table 1.

TABLE 1

| Sample number | Sample | Radiation absorbed dose (mrad) | Weight increase (percent) | Clark stiffness |
|---|---|---|---|---|
| 1 | PP synthetic paper | | | 15 |
| 2 | do | 0.5 | 6 | 20 |
| 3 | do | 1.0 | 9 | 23 |
| 4 | PP film | | | 4 |
| 5 | do | 0.5 | | 4 |
| 6 | do | 1.0 | | 4 |

2. Various films were irradiated by means of 2 4-Meb, 750-W, linear accelerator manufactured by the Mitsubishi Heavy Industry Co., Ltd. The compiled results are shown in Table 2.

TABLE 2

| Sample No. | Sample | Process conditions | | | | Clark stiffness | Thickness (micron) | Specific gravity |
|---|---|---|---|---|---|---|---|---|
| | | Impregnation time (min.) | MMA/MeOH | Absorbed dose (mrad) | Wt. increase (percent) | | | |
| 10 | PE synthetic paper | | | | | 13 | 50 | 0.61 |
| 11 | do | 5 | 80/20 | 3 | 6 | 14 | 50 | 0.62 |
| 12 | do | 10 | 80/20 | 3 | 15 | 20 | 51 | 0.65 |
| 13 | do | 10 | 80/20 | 8 | 15 | 18 | 52 | 0.65 |
| 14 | do | 20 | 80/20 | 3 | 18 | 25 | 51 | 0.7 |
| 15 | do | 10 | 70/30 | 3 | 14 | 22 | 52 | 0.65 |
| 16 | PP synthetic paper | | | | | 20 | 70 | 0.7 |
| 17 | do | 10 | 70/30 | 3 | 20 | 32 | 72 | 0.8 |
| 18 | do | 10 | 70/30 | 8 | 18 | 30 | 73 | 0.8 |
| 19 | PE film | 10 | 70/30 | 3 | | 3 | 50 | 0.96 |
| 20 | PP film | 10 | 70/30 | 3 | | 4 | 50 | 0.90 |

3. The PP synthetic paper was made in the following manner. A polypropylene of a MI of 0.8 was heated and kneaded in an extruder operated at 270° C. and extruded through a die into a film, which was cooled to a temperature below 40° C. by a cooling device, whereupon an unstretched film was obtained. This film was stretched 5.5 times its original length by means of a longitudinal stretching machine.

A composition was prepared separately by mixing 15 percent by weight of talc and 15 percent by weight of titanium white with a polypropylene of a MI of 4.00. This composition was laminated by extrusion onto one surface of the above described film monoaxially stretched in the longitudinal direction.

The resulting laminated sheet was then heated and stretched 7.5 times its original width in the transverse direction and was then cooled in its as-stretched state. The lateral edges of this sheet were trimmed off, and the sheet was wound. The thicknesses of sheets thus made are indicated in Table 2.

The PE synthetic paper was made in the following manner. A composition of 60 percent of high-density polyethylene, 20 percent of polypropylene, and 20 percent of a fine filler, all percentages being by weight, was heated and kneaded in an extruder operated at 230° C. and was then extruded through a die to form a sheet, which was then cooled to a temperature below 40° C., whereupon an unstretched sheet was obtained.

This sheet was biaxially stretched 4 x 4 times its original dimensions simultaneously at a stretching speed of 180 cm./minute in each direction, and the sheet thus obtained was cooled while being maintained in its as-stretched state. The edges were trimmed off.

The PE film was a film of a thickness of 50 microns in which high-density polyethylene of a MI of 0.3 and a specific gravity of 0.95 was used.

The Clark stiffnesses were determined in conformance with TAPPI/T-451.

We claim:

1. A process for producing opaque synthetic-resin films of improved stiffness which comprises:
    (a) preparing a synthetic-resin film containing a fine particulate filler uniformly blended therewith;
    (b) stretching said synthetic-resin film thereby to produce a film having microvoids, dispersed in those regions of the film near the outer surface thereof communicating with the outside of the film and being substantially discontinuous in directions perpendicular to the outer surface of the film;
    (c) introducing a polymerizable monomer into said microvoids communicating with the outside; and
    (d) polymerizing said monomer within said microvoids.

2. A process as claimed in claim 1 in which said synthetic-resin film comprises a film of a polymer of an olefin selected from the group consisting of ethylene, propylene, and butene-1.

3. A process as claimed in claim 1 in which said polymerizable monomer is an ethylenically unsaturated monomer.

4. A process as claimed in claim 1 in which said monomer is introduced into the microvoids by impregnating the synthetic-resin film with a solution containing the monomer.

5. A process as claimed 1 in which said monomer is polymerized within said microvoids by irradiation with radiation rays.

References Cited
UNITED STATES PATENTS

| | | | |
|---|---|---|---|
| 2,320,536 | 6/1943 | Pollack et al. | 117—161 UB UX |
| 3,250,642 | 5/1966 | Parasacco et al. | 117—138.8 E |
| 3,552,986 | 1/1971 | Bassemir et al. | 117—93.31 |
| 3,676,195 | 7/1972 | Kehr et al. | 117—138.8 A |

WILLIAM D. MARTIN, Primary Examiner

T. G. DAVIS, Assistant Examiner

U.S. Cl. X.R.

117—47 A, 93.31, 138.8 E, 138.8 N, 138.8 PV, 138.8 VA